(12) United States Patent
O'Donnell et al.

(10) Patent No.: US 12,554,899 B2
(45) Date of Patent: Feb. 17, 2026

(54) FULL SYSTEM LOCKOUT

(71) Applicant: Dell Products L.P., Round Rock, TX (US)

(72) Inventors: Sean P. O'Donnell, Poughkeepsie, NY (US); Matthew Bryan Gilbert, Bend, OR (US); Richard William Guzman, Lago Vista, TX (US); Kevin Michael Keller, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 227 days.

(21) Appl. No.: 18/496,258

(22) Filed: Oct. 27, 2023

(65) Prior Publication Data

US 2025/0139306 A1     May 1, 2025

(51) Int. Cl.
*G06F 21/86*     (2013.01)

(52) U.S. Cl.
CPC .................... *G06F 21/86* (2013.01)

(58) Field of Classification Search
None
See application file for complete search history.

(56) References Cited

U.S. PATENT DOCUMENTS

| | | | |
|---|---|---|---|
| 7,002,799 B2 | 2/2006 | Malone et al. | |
| 8,941,993 B2 | 1/2015 | Eckberg et al. | |
| 9,915,085 B2* | 3/2018 | Strmiska | H05K 7/1489 |
| 10,324,503 B1 | 6/2019 | O'Donnell | |
| 11,096,307 B2* | 8/2021 | Sassano | H05K 5/0226 |
| 11,334,125 B1 | 5/2022 | Crisp | |
| 11,665,840 B1* | 5/2023 | O'Donnell | H05K 7/1409 |
| | | | 361/801 |
| 11,723,167 B2 | 8/2023 | Chen | |
| 2008/0265723 A1* | 10/2008 | Kerrigan | H05K 7/20181 |
| | | | 312/223.2 |
| 2018/0303005 A1* | 10/2018 | Besterman | F16M 13/02 |
| 2020/0030734 A1 | 1/2020 | Hara | |
| 2020/0333856 A1 | 10/2020 | Quijano | |
| 2023/0128507 A1 | 4/2023 | Clark | |
| 2023/0129135 A1 | 4/2023 | Clark | |

* cited by examiner

*Primary Examiner* — Christopher C Harris
(74) *Attorney, Agent, or Firm* — WOMBLE BOND DICKINSON (US) LLP

(57) ABSTRACT

Methods, systems, and devices for providing computer implemented services are disclosed. To provide the computer implemented services, a data processing system may include various hardware components within an interior of a chassis. To secure the various hardware components, the data processing system may include a security system. The security system may include a security bezel and a sled for limiting movement of the chassis. To do so, the sled may reversibly attach to a rail on which the chassis is positioned and reversibly fixedly attach to the security bezel to a position on the chassis. By doing so, the security bezel may cover an opening through which access to the hardware components is provided. Additionally, by doing so, the security bezel may be positioned with the rail, thereby limiting the movement of the chassis.

20 Claims, 13 Drawing Sheets

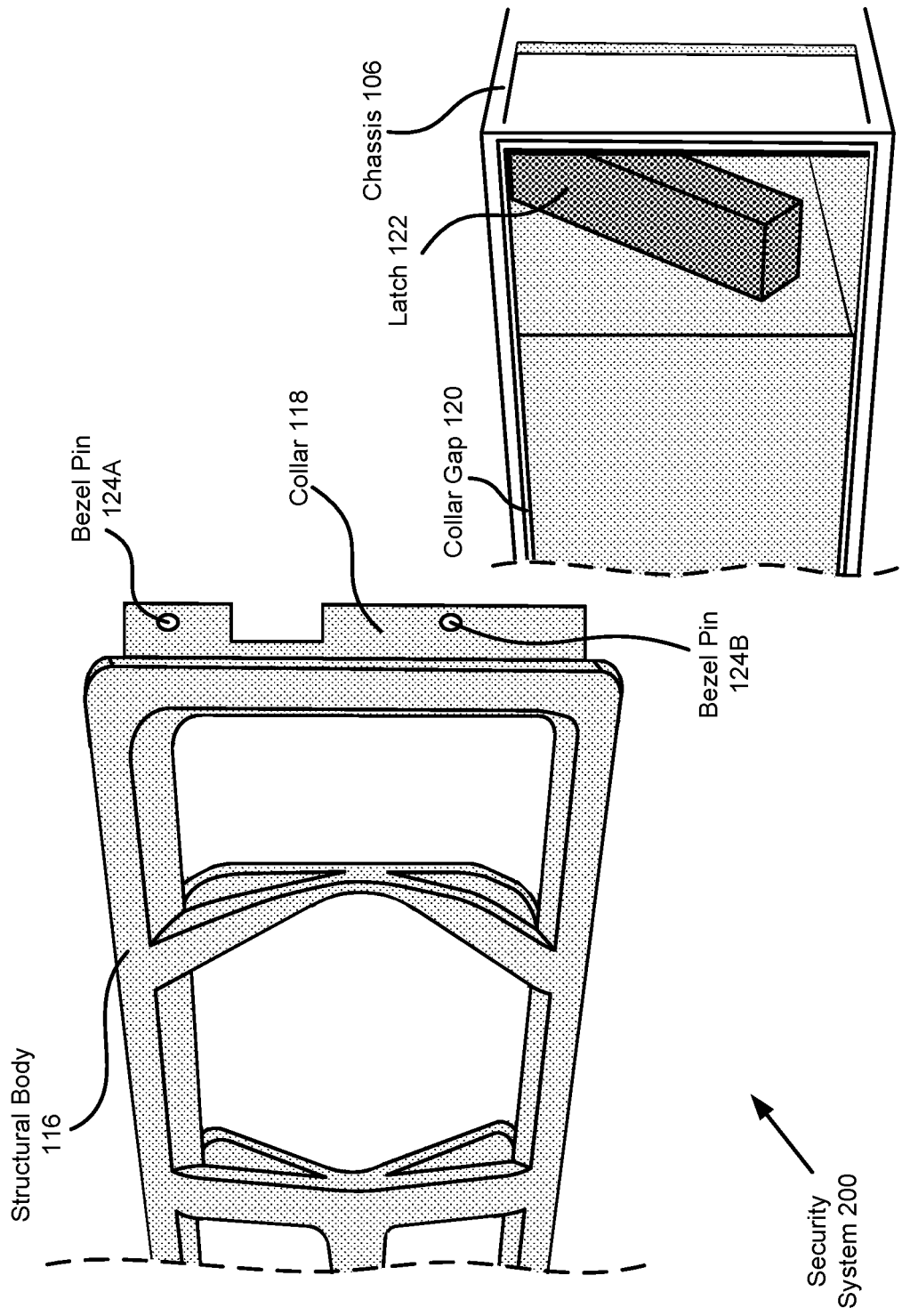

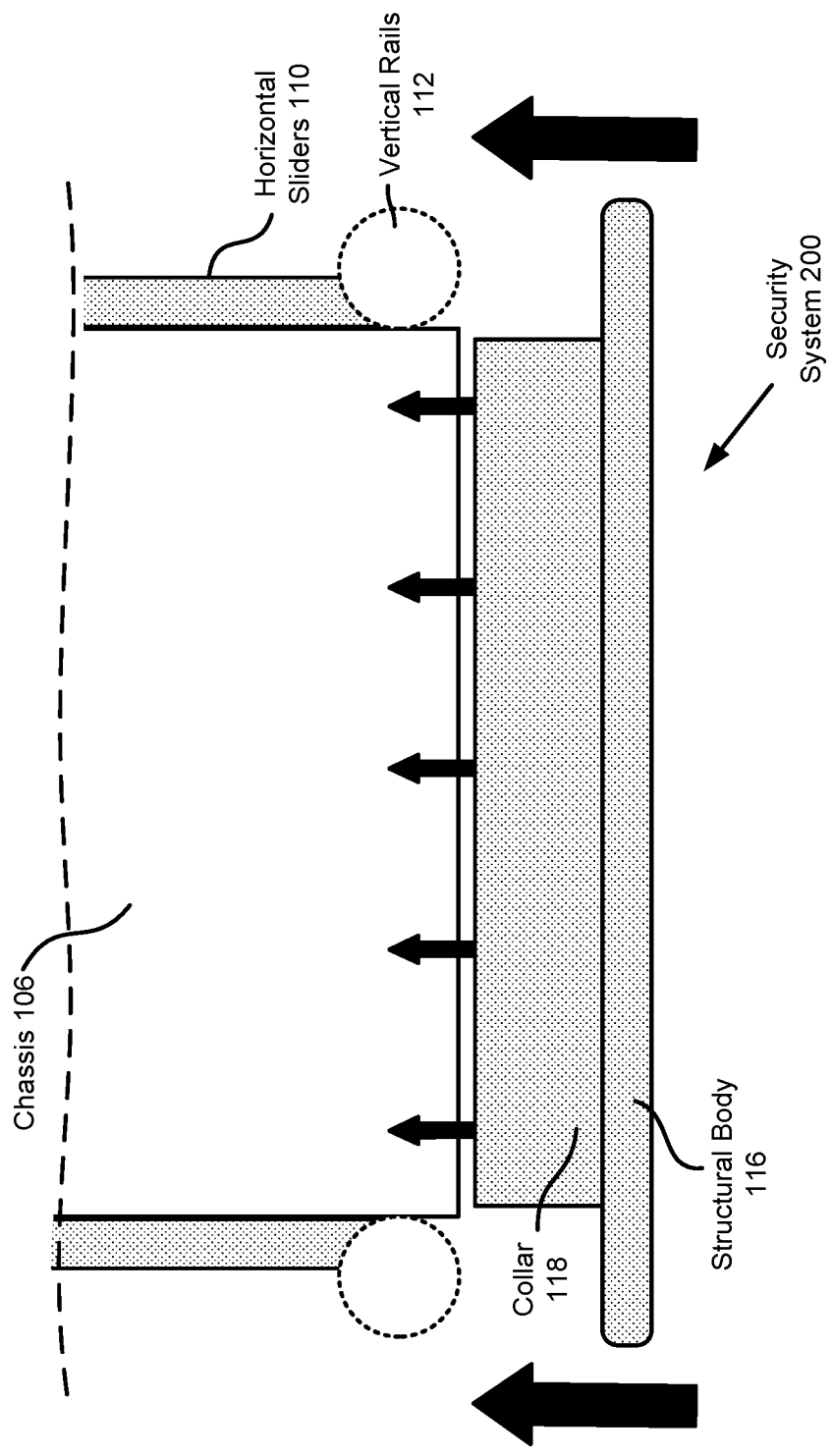

FULL SYSTEM LOCKOUT

FIELD

Embodiments disclosed herein relate generally to device management. More particularly, embodiments disclosed herein relate to managing security of devices.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIG. 2A-3H show diagrams illustrating a security system in accordance with an embodiment.

DETAILED DESCRIPTION

Figure 1A:
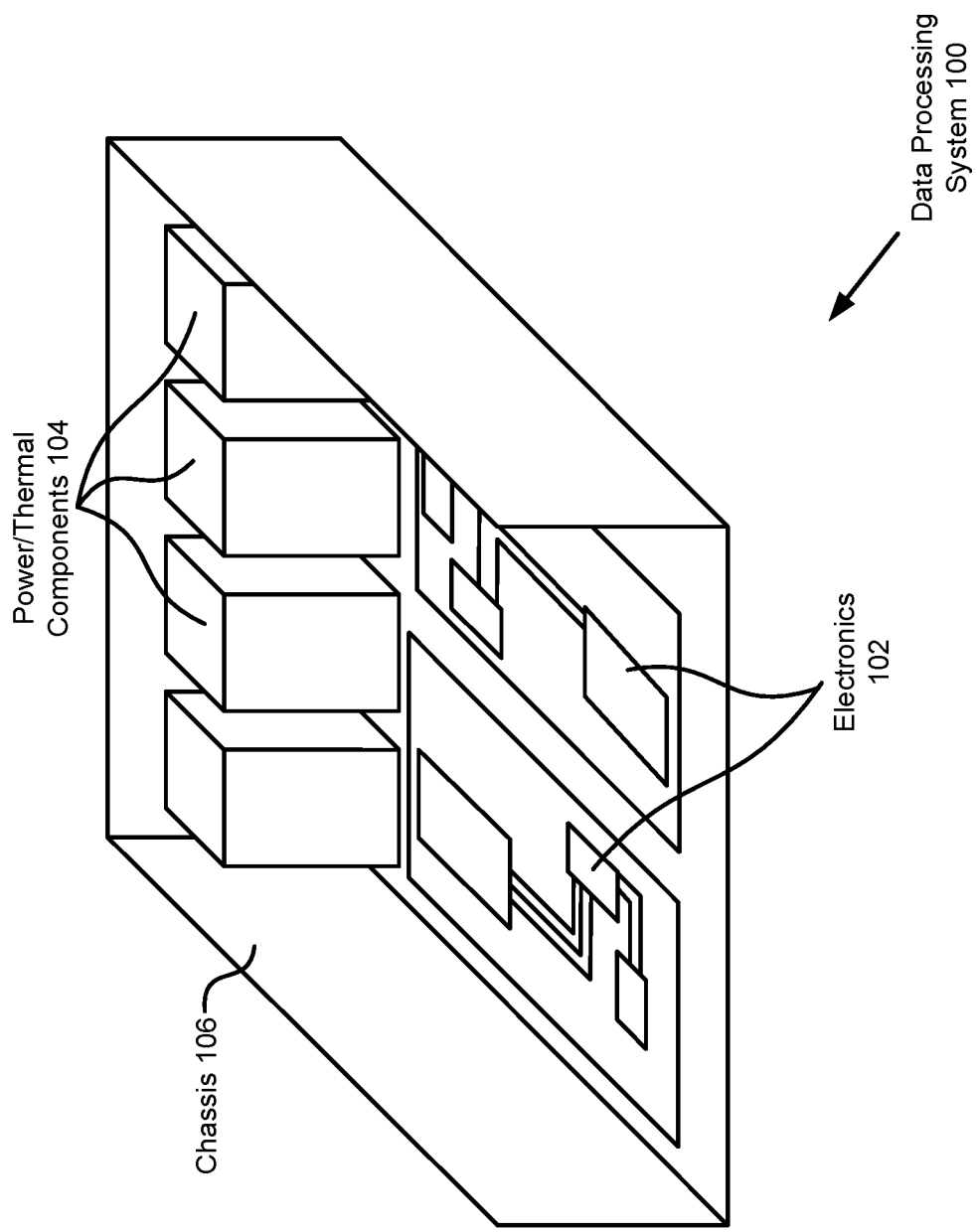
FIGS. 1A-1B show block diagrams illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for providing, at least in part, computer implemented services. To provide the services, a system may include any number of hardware components (e.g., storage devices, memory modules, processors, etc.). To facilitate placement and management of the hardware components, the hardware components may be positioned in a chassis. For example, the chassis may be a form factor compliant (e.g., a ½U sled) enclosure. Additionally, this enclosure may be one of any number of enclosures included in a rack mount chassis management system, the enclosure being capable of sliding into a portion of space within an interior of the chassis management system.

The enclosure, to provide its functionality, may include one or more openings through which access to the hardware components is provided. For example, the enclosure may have a first opening and a second opening. The first opening may be through a front surface of the enclosure and the second opening may be through a top surface of the enclosure. Additionally, to position the enclosure within the interior of the chassis management system, the enclosure may be slid through a front of the chassis management system and towards a back of the chassis management system, the first opening facing a same direction as the front of the chassis management system.

By having the first opening face the same direction while the enclosure is positioned within the interior of the chassis management system, a first portion of the access may be provided by the first opening. This first portion of the access may facilitate (e.g., without removal of the enclosure from the chassis management system) insertion and/or removal of hot swap components and may facilitate airflow into and/or out of the enclosure.

Additionally, the second opening, normally covered when the enclosure is positioned within the interior of the chassis management system, may provide a second portion of the access to the hardware components when slid out of the chassis management system. Thus, while at least partially available from an exterior of the chassis management system, the second portion of the access may facilitate insertion and/or removal of the hardware components.

Consequently, access to the hardware components provided by an opening in the chassis (e.g., the first and/or second opening), may leave the hardware components vulnerable to compromise (e.g., due to theft and/or damage of the hardware components). If damaged, the hardware components may be prevented from providing various functionalities (on which the computer implemented services depend) as intended. Additionally, for example, the hardware components may be stolen using the access. Once removed, the stolen hardware components would not be capable of providing the various functionalities on which the computer implemented services depend. Thus, the vulnerability provided by the access may increase a likelihood of compromise of the computer implemented services.

To decrease the likelihood of compromise of the hardware components, the data processing system may include a security system to limit access to the hardware components. The security system may prevent movement of the enclosure with respect to the rack mount chassis management system and at least partially prevent intrusion into an interior of the enclosure through the one or more openings.

To do so, the security system may include a security bezel and a sled. While positioned within the interior of the chassis management system, for example, this security bezel may be positioned over the first opening, thereby obstructing the first opening and preventing intrusion into the enclosure. Additionally, the security bezel may have a first length that spans a greater distance than that of a second length of the first opening. For example, the security bezel may span from a left-hand rail of the chassis management system to a right-hand rail of the chassis management system, these rails facilitating placement of the enclosure within the interior of the chassis management system.

By spanning from a first of the rails to a second of the rails, the security bezel may cover both the first opening and at least a portion of each of the rails. Thus, when reversibly fixed to the sled, the sled being reversibly attached to at least one of the rails, the security bezel may prevent the movement of the enclosure with respect to the chassis management system until detached from the sled. By doing so, the likelihood of compromise of the hardware components (and therefore, of the computer-implemented services) may be decreased.

In an embodiment, a security system for a data processing system is provided.

The security system may include a security bezel adapted to: limit access to an interior of the chassis through an opening in the chassis while the security bezel is positioned with the opening, and limit movement of the chassis with respect to rails of a rack mount system for the chassis while the security bezel is locked to at least one of the rails; and a sled adapted to: reversibly attach to the at least one of the rails, and while attached to a rail, reversibly fixedly attach to the security bezel to position the security bezel with the opening.

The security bezel may include a structural body; a collar that extends from a surface of the structural body; and a bezel pin adapted to interface with the sled to reversibly fixedly attach to the security bezel, wherein the bezel pin is connected to and extends from a surface of the collar.

The collar may have a shape adapted to fit into a portion of the chassis to maintain alignment of the security bezel with the sled during reversible fixed attachment of the security bezel to the sled.

The structural body may have a shape that is adapted to cover the opening when positioned with the opening, and a structure that allows gasses to flow through the opening while the structural body is positioned with the opening.

The structure of the structural body may also be adapted to prevent intrusion into the chassis via the opening.

The sled may include: a first portion adapted to attach to the rails; a second portion slidably attached to the first portion to enable translation of the second portion between a first position and a second portion while the first portion is attached to the rails; and a bezel pin receiver to receive the bezel pin, while the bezel pin is received by the bezel pin receiver the security bezel is fixedly attached to the sled.

Receiving the bezel pin by the bezel pin receiver may include an approach of the bezel pin to the bezel pin receiver, the bezel pin applying a force to the bezel pin receiver during the approach to cause the second portion to move from the first position to the second position, and the second portion returning to the first position once the bezel pin is received by the bezel pin receiver.

The sled may further include a return spring adapted to return the sled to the first position.

The security system may further include a force receiving member adapted to receive a force, when the force is received via the force receiving member, the return spring being overcome and the second portion moving from the first position to the second position to facilitate detachment of the security bezel from the sled.

The detachment of the security bezel may be adapted to permit movement of the chassis.

The security system may further include a latch adapted to apply the force to the to the force receiving member.

In an embodiment, a data processing system is provided that may include the security system as discussed above.

In an embodiment, an enclosure that may include the security system as discussed above is provided.

Turning to FIG. 1A, a diagram illustrating a data processing system in accordance with an embodiment is shown. The data processing system shown in FIG. 1A may provide computer implemented services. The computer implemented services may include any type and/or quantity of computer implemented services. For example, the computer implemented services may include data storage services, instant messaging services, database services, and/or any other type of service that may be implemented with a computing device.

To provide the computer implemented services, the data processing system may include various hardware components. These hardware components may facilitate various functionalities of a data processing system (e.g., 100). For example, to provide the computer implemented services, data processing system 100 may include electronics 102, power/thermal components 104, and chassis 106. Each of these is discussed below.

Electronics 102 may include various types of hardware components such as processors, memory modules, storage devices, communications devices, and/or other types of devices. Any of these hardware components may be operably connected to one another using circuit card traces, cabling, connectors, etc. that establish electrical connections used to transmit information between the hardware components.

Power/thermal components 104 may power any of the components of data processing system 100 and/or thermally manage any of the components of data processing system 100. For example, power/thermal components 104 may include power supplies, fans, and/or other types of devices usable to power and/or thermally manage the components.

Any of the components of data processing system 100 may be positioned in chassis 106. Chassis 106 may include an enclosure in which physical structures of electronics 102 (e.g., processors, memory, etc.) and power/thermal components 104 (e.g., power supplies, fans, etc.) may be positioned. Chassis 106 may facilitate placement and management of electronics 102 and/or other components in a computing environment.

To provide its functionality, chassis 106 may be implemented with a form factor compliant (e.g., a ½U sled) enclosure usable to integrate data processing system 100 into a high-density computing environment, such as a rack mount chassis management system. Additionally, this enclosure may be one of any number of enclosures included in the rack mount chassis management system, the enclosure being capable of sliding into a portion of space within an interior of the chassis management system. For additional information regarding the chassis management system, refer to FIG. 1B.

To facilitate the placement and management of the components within chassis 106, chassis 106 may include one or more openings (e.g., on a front side, a back side, and/or a top side of chassis 106) through which access to the hardware components of data processing system 100 is provided. For example, a first opening through the front side of chassis 106 may provide a first portion of the access. This first portion of the access may facilitate insertion and/or removal of hot swap components for chassis 106. Additionally, the first opening may facilitate airflow into and/or out of chassis 106, thereby providing additional thermal management (e.g., cooling) for data processing system 100.

Additionally, for example, a second opening through the top side of chassis 106 may provide a second portion of the access. For example, this second opening may normally be covered (e.g., by another chassis, a top surface of the chassis management system, etc.) when chassis 106 is positioned within the interior of the chassis management system. However, when slid out of the chassis management system, the second opening may provide the second portion of the access to the hardware components. Thus, while at least partially available from an exterior of the chassis management system, the second portion of the access may facilitate insertion and/or removal of the hardware components.

However, the access to the hardware components provided by the one or more openings in the enclosure may leave data processing system 100 vulnerable to compromise (e.g., due to theft and/or damage of the hardware components). For example, a negligent and/or an incompetent individual may interact with the hardware components using the access, resulting in bent contact pins, ruptured liquid cooling tubes, and/or other physical damages caused by the individual. If damaged, the hardware components may be prevented from providing various functionalities (on which the computer implemented services depend) as intended.

Additionally, for example, the hardware components may be stolen from chassis 106 using the access. Once removed, the stolen hardware components may not be available to data processing system 100, and therefore, would not be capable of providing the various functionalities on which the computer implemented services depend.

Thus, the vulnerability provided by the access may increase a likelihood of compromise of the computer implemented services.

In general, embodiments disclosed herein relate to systems, methods, and devices for managing security of a data processing system. More particularly, embodiments disclosed herein may relate to security management of hardware components of a data processing system. The security of the hardware components may be managed to decrease a likelihood of compromise caused by access to the hardware components. To do so, the data processing system (e.g., 100) may include a security system as seen in FIG. 1B (discussed below).

While illustrated in FIG. 1A with a limited number of specific components, a data processing system may include additional, fewer, and/or different components without departing from embodiments disclosed herein.

Figure 1B:
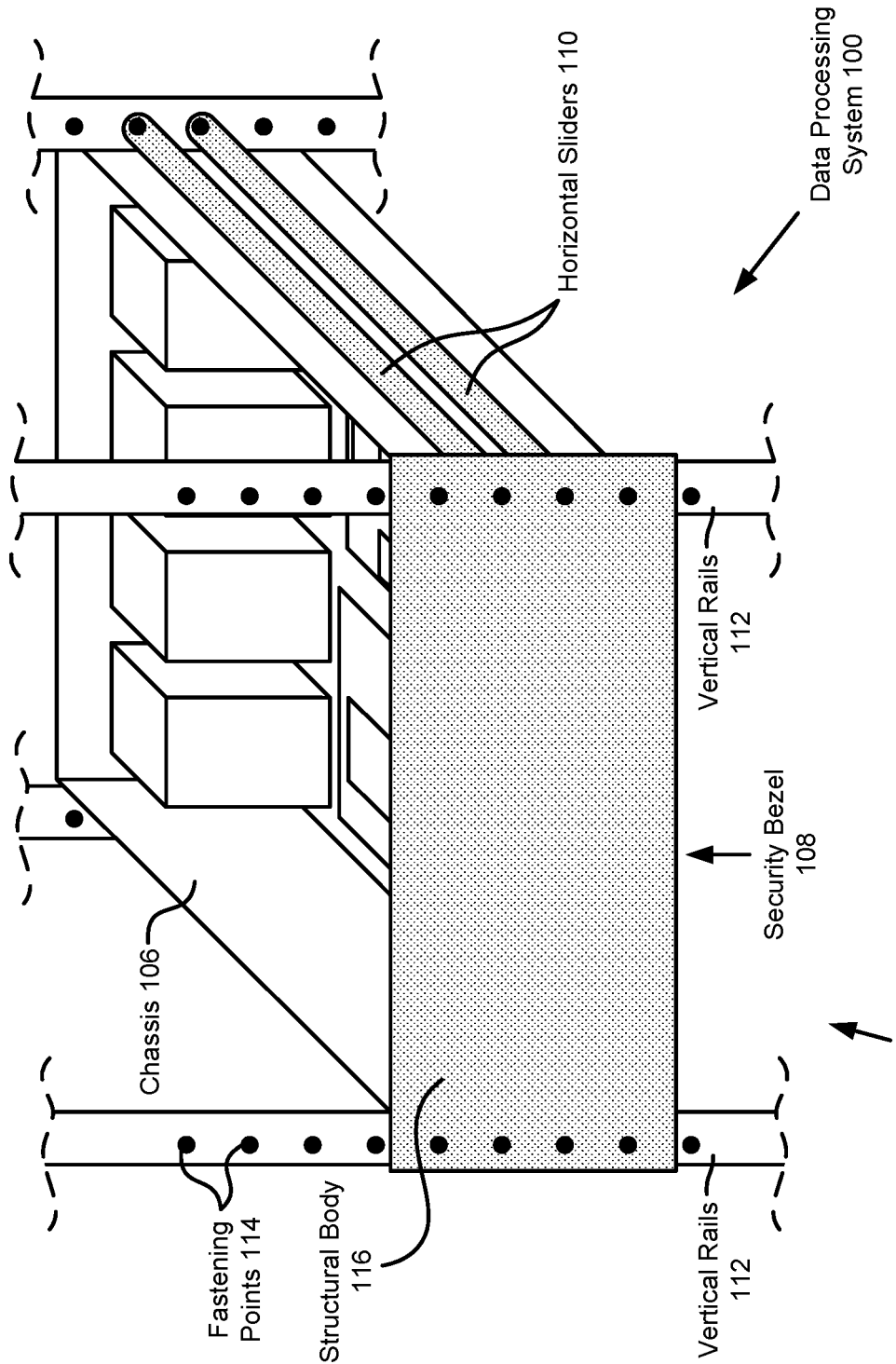

Turning to FIG. 1B, a second diagram illustrating data processing system 100 in accordance with an embodiment is shown.

The data processing system may include security bezel 108 which may protect components positioned in chassis 106 while still allowing air to flow through chassis 106. Additionally, security bezel 108 may be selectively locked along with chassis 106 to vertical rails 112 to prevent and/or otherwise limit access to the interior of chassis 106 through a top of chassis 106 (e.g., by preventing chassis 106 from being rolled out thereby allowing access to the top of chassis 106 and through which the interior of chassis 106 may be accessed). Security bezel 108 may be a part of the security system. Refer to FIGS. 3A-3H regarding additional parts of the security system.

To provide the above noted functionality, a high-density computing environment may include vertical rails 112 and data processing system 100 which may include horizontal sliders 110 and security bezel 108. Each of these components of the high-density computing environment is discussed below.

Vertical rails 112 may facilitate positioning, orienting, and/or otherwise physically managing data processing system 100 in space. Vertical rails 112 may include, for example, structural members such as metal bars to which various components may be attached. For example, vertical rails 112 may include fastening points 114. Fastening points 114 may include threaded holes or other structures that facilitate attachment of components to vertical rails 112. In this manner, horizontal sliders 114 may be fixedly attached to vertical rails 112. Similarly, security bezel 108 may be selectively attached to vertical rails 112 to prevent access to the interior of chassis 106.

Horizontal sliders 110 may limit movement of chassis 106 to a horizontal path leading into and/or out of the interior of the rack mount system (e.g., to guide chassis 106 during insertion and/or removal of chassis 106 from the high-density computing environment). Horizontal sliders 110 may include, for example, rack mount server rails. Horizontal sliders 110 may be attached to chassis 106 and vertical rails 112.

Security bezel 108 may limit access to the hardware components within chassis 106, reversibly secure chassis 106 to vertical rails 112, and facilitate air flow through chassis 106. To do so, security bezel 108 may include structural body 116.

Structural body 116 may prevent access through an opening of chassis 106. Structural body 116 may include structural components such as bars, plates, and/or other physical structures. These physical structures may be arranged to cover the opening while allowing air to flow through structural body 116. Refer to FIG. 2A for an example of structural body 116.

Thus, inclusion of security bezel 108 may protect components positioned in chassis 106 and facilitate airflow through chassis 106.

Turning to FIG. 2A, a first diagram illustrating security system 200 in accordance with an embodiment is shown.

To protect components positioned in chassis 106, security system 200 may selectively lock both security bezel 108 and chassis 106 to vertical rails 112.

To provide the above noted functionality, security system 200 may include security bezel 108, and chassis 106 (or components thereof). Each of these components of security system 200 is discussed below.

Security bezel 108 may protect components positioned in chassis 106 by covering an opening in chassis 106 through which air may flow. Security bezel 108 may include structural body 116 (refer to the description of FIG. 1B for additional details) and collar 118.

Collar 118 may align security bezel 108 with chassis 106 to cover the opening in chassis 106. Collar 118 may include a raised portion attached to the structural members of structural body 116. The raised portion may have a shape and/or size complementary to a portion of chassis 106. For example, the raised portion may have a shape that allows it to extend toward and interior of chassis 106. When positioned inside chassis 106, the raised portion may position structural body 116 over the opening of chassis 106.

Additionally, collar 118 may include attachment members to facilitate attachment of security bezel 108 to vertical rails 112. For example, collar 118 may include bezel pins 124A-124B to facilitate selective attachment to vertical rails 112. Refer to FIGS. 3A-3G for additional details regarding selective attachment of security bezel 108 to vertical rails 112.

Chassis 106 may also facilitate protection of components positioned in chassis 106 by selectively locking security bezel 108 to vertical rails 112. To do so, chassis 106 may include collar gap 120 and latch 122.

Collar gap 120 may facilitate alignment between security bezel 108 and chassis 106. Collar gap 120 may include a recess and/or other types of gaps in which collar 118 may be positioned. For example, collar gap 120 and collar 118 may have complementary shapes to facilitate at least partial insertion of collar 118 into chassis 106.

Latch 122 may facilitate reversable attachment of security bezel 108 to vertical rails 112. Latch 122 may include a structural member that is actuatable by a person. Latch 122 may be mechanically coupled to a sled and/or other components of security system 200. Actuation of latch 122 may enable security bezel 108 to be detached from vertical rails 112. Because security bezel 108 may retain chassis 106 in position while security bezel 108 is attached to chassis 106, detachment of security bezel 108 may also allow chassis 106 to move freely. Refer to FIGS. 3A-3H for additional detail regarding selective attachment of security bezel 108 to vertical rails 112.

Thus, security system 200 may protect components positioned within chassis 106 by facilitating selective attachment of security bezel 108 to vertical rails 112.

Turning to FIG. 2B, a second diagram illustrating security system 200 in accordance with an embodiment is shown. The viewpoint of FIG. 2B may be a top view of chassis 106.

To protect components positioned in chassis 106, security bezel 108 may automatically align itself with an opening in chassis 106. Consequently, when locked to vertical rails 112, structural body 116 may automatically cover the opening.

To automatically align itself with the opening in chassis 106, collar 118 may have a shape that is complementary to a shape of the opening. For example, a width of collar 118 may be smaller than a width of the opening, thereby allowing insertion of collar 118 into the opening.

Additionally, to prevent an entirety of security bezel 108 from being inserted through the opening, collar 118 may be physically attached to structural body 116. Structural body 116 may have a shape and/or size that is incompatible with the shape of the opening. For example, a width of structural body 116 may be larger than the width of the opening, thereby preventing insertion of structural body 116 through the opening.

Thus, security bezel 108 may protect components positioned within chassis 106 by automatically aligning with the opening and covering the opening when locked to vertical rails 112.

While illustrated in FIG. 2B with a limited number of specific components, a security system may include additional, fewer, and/or different components without departing from embodiments disclosed herein.

As noted above, to protect components inside of chassis 106, security bezel 108 may be reversibly locked to vertical rails 112. FIGS. 3A-3H show a series of diagrams illustrating processes of locking the security bezel to the vertical rails and unlocking the security bezel from the vertical rails. Generally, the diagrams illustrate the processes in a temporal order in which the processes may be performed. For example, FIG. 3A may show a first diagram illustrating the security bezel prior to being locked to the vertical rails while FIG. 3B may show a second diagram illustrating part of the process of locking the security bezel to the vertical rails. The viewpoint in FIGS. 3A-3H may be from a side of chassis 106 (at least a portion of the chassis may not be drawn in these figures to illustrate activity within the chassis from this viewpoint).

Figure 3A:
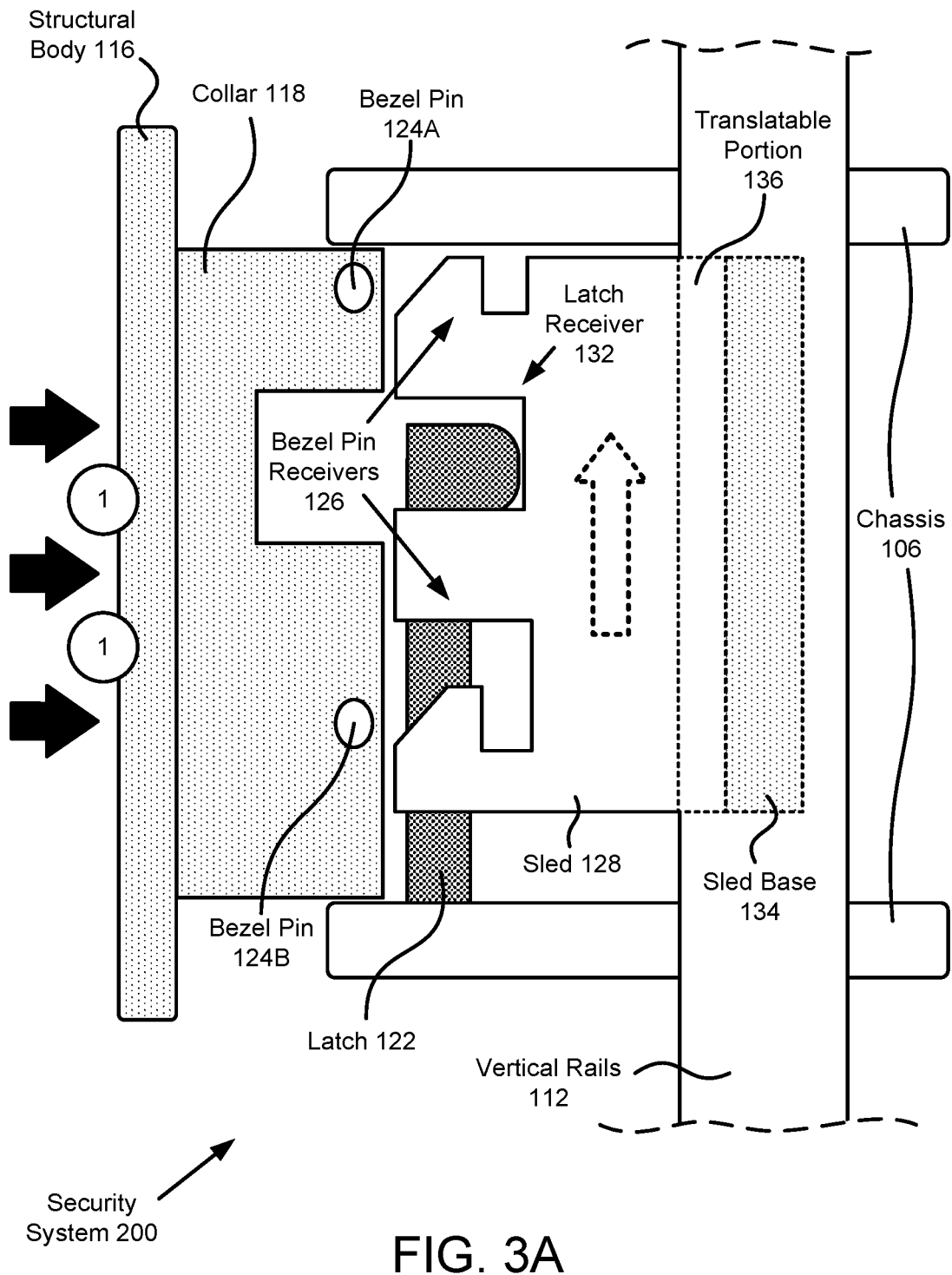

Turning to FIG. 3A, a third diagram illustrating security system 200 in accordance with an embodiment is shown.

As noted above, both chassis 106 and security bezel 108 may be reversibly secured to vertical rails 112 to prevent and/or otherwise limit access to the interior of chassis 106 through a top of chassis 106.

To provide the above noted functionality, security system 200 may include security bezel 108, chassis 106 (or components thereof), sled 128, and vertical rails 112. Each of these components of security system 200 is discussed below.

Security bezel 108 may protect components positioned in chassis 106 when reversibly secured to vertical rails 112, thereby fixed in a position that covers the opening. To secure itself to vertical rails 112, security bezel 108 may include bezel pins (e.g., 124A-124B, mentioned previously with regard to FIG. 2A).

The bezel pins may include, for example, raised protrusions positioned on collar 118. The protrusions may be aligned with bezel pin receivers 126. When received by bezel pin receivers 126, the bezel pins may be fixedly held in place thereby locking security bezel 108 to vertical rails 112.

Sled 128 may facilitate reversible attachment of security bezel 108 to vertical rails 112. For example, sled 128 may be attached to vertical rails 112 and bezel pin receivers 126 may hold security bezel 108 in place while the bezel pins are received. Sled 128 may include bezel pin receivers 126, latch receiver 132, a sled base 134, and a translatable portion 136.

Bezel pin receivers 126 may be positioned with translatable portion 136 so that bezel pin receivers 126 may move between two positions. In the first position, bezel pin receivers 126 may hold the bezel pins in place. In the second position, bezel pin receivers 126 may allow the bezel pins to move freely.

The sled base 134 may facilitate attachment of sled 128 to vertical rails 112. Sled base 134 may include, for example, attachment elements such as hooks, bolts, screws, etc. that allow sled base 134 to attach to a portion of vertical rails 112. The translatable portion 136 may be mechanically coupled to sled base 134 using any type of mechanism.

Latch receiver 132 may receive forces applied by latch 122. The received forces may translate translatable portion 136 from the first position to the second position. Thus, actuation of latch 122 may unlock security bezel 108 from vertical rails 112. Latch receiver 132 may be positioned with translatable portion 136.

While not shown, sled 128 may include a return mechanism such as a spring that returns (by applying a constant force, depicted using an arrow with a dotted outline) translatable portion 136 to the first position while force is not applied by latch 122. Thus, security bezel 108 may generally be locked to vertical rails 112 unless latch 122 is actuated.

Using the above noted components, security bezel 108 may be reversibly locked to vertical rails 112. For example, consider a scenario where security bezel 108 is initially unlocked from vertical rails 112 as shown in FIG. 3A.

To initiate locking of security bezel 108 to vertical rails 112, at operation 1 (e.g., shown in circles in FIG. 3A, similar numbered circles shown in FIGS. 3B-3H to illustrate different operations), a first force may be applied to security bezel 108. This first force may be applied in a first direction towards the opening of chassis 106 (e.g., a horizontal force depicted using bold black arrows that point to a right of the page).

Figure 3B:
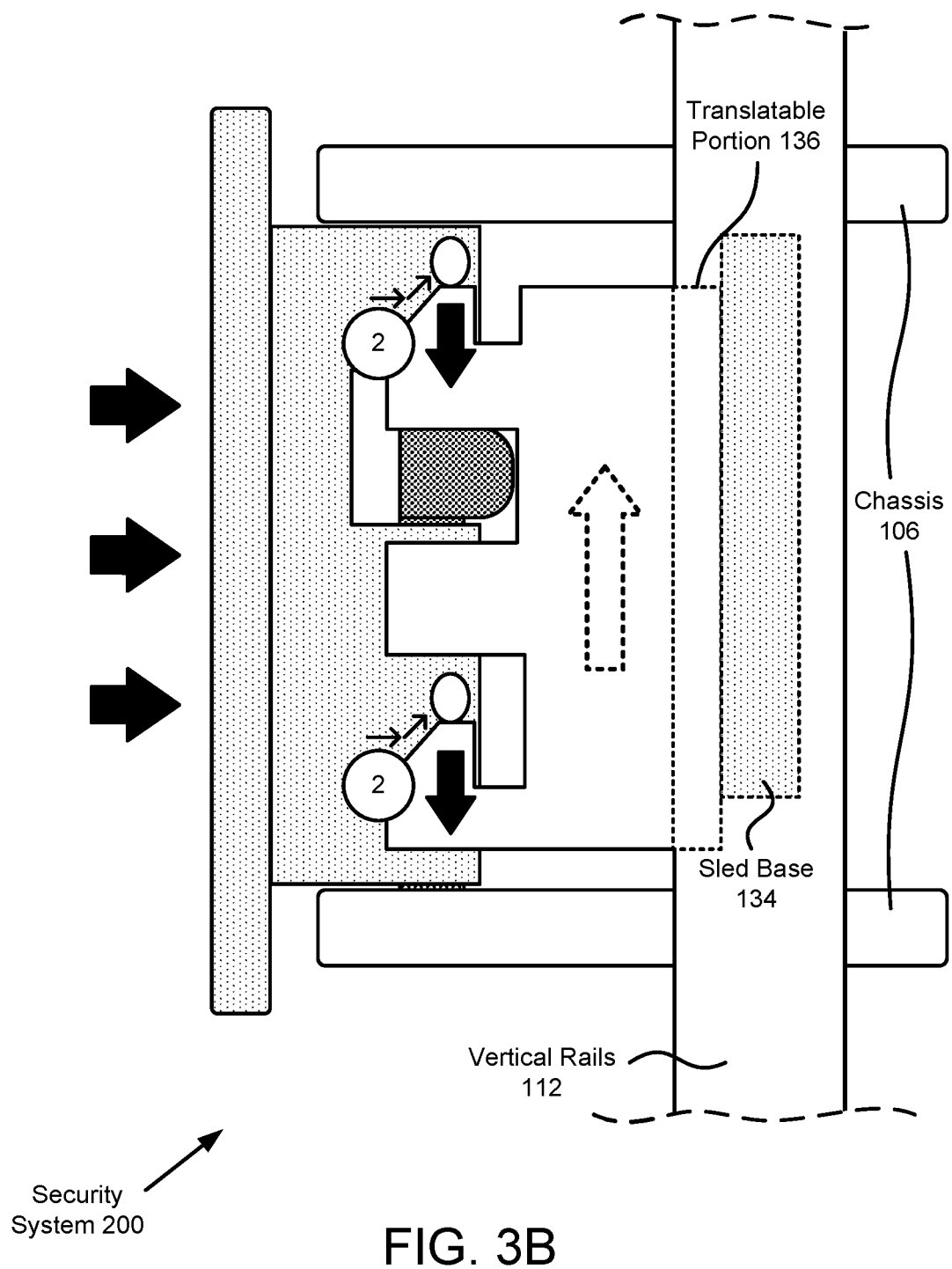

Turning to FIG. 3B, a fourth diagram illustrating security system 200 in accordance with an embodiment is shown.

At operation 2, the first force may cause the bezel pins to move toward bezel pin receivers 126 (e.g., in the first direction). The bezel pins may cause bezel pin receivers 126 to move in a second direction, thereby overcoming the constant force from the return mechanism.

For example, bezel pin receivers 126 may each have a ramp-like shape, as depicted in FIGS. 3A-3H. When the bezel pins apply force to a surface of the ramp-like shape, bezel pin receivers 126 may move, for example, in a downward direction (e.g., opposite to the constant force from the return mechanism.)

Figure 3C:
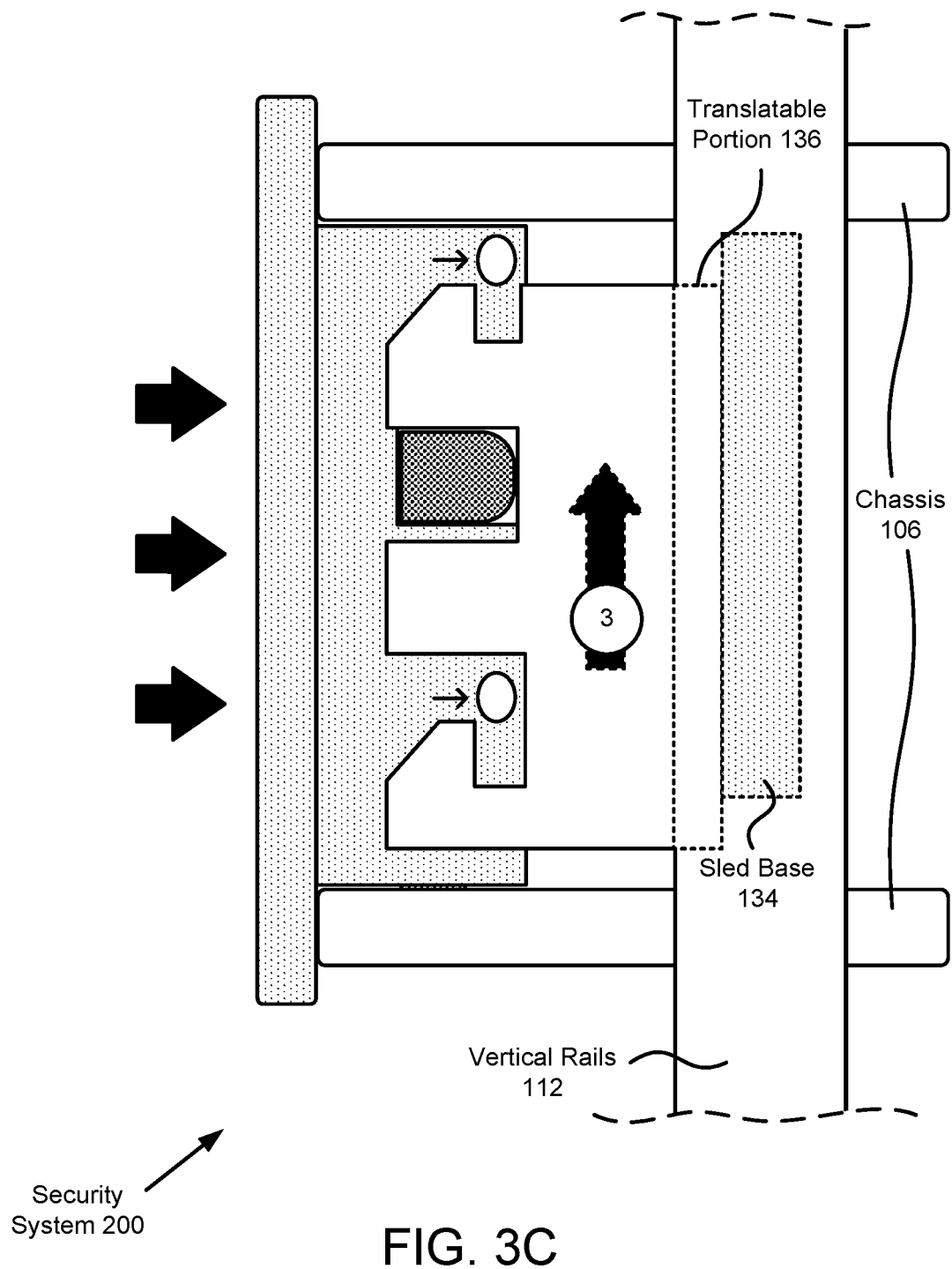

Turning to FIG. 3C, a fifth diagram illustrating security system 200 in accordance with an embodiment is shown.

At operation 3, the bezel pins may continue to move in the first direction until halted by contact with sled 128. Once halted, the constant force of the return mechanism may be applied to sled 128 without resistance from the bezel pins.

Figure 3D:
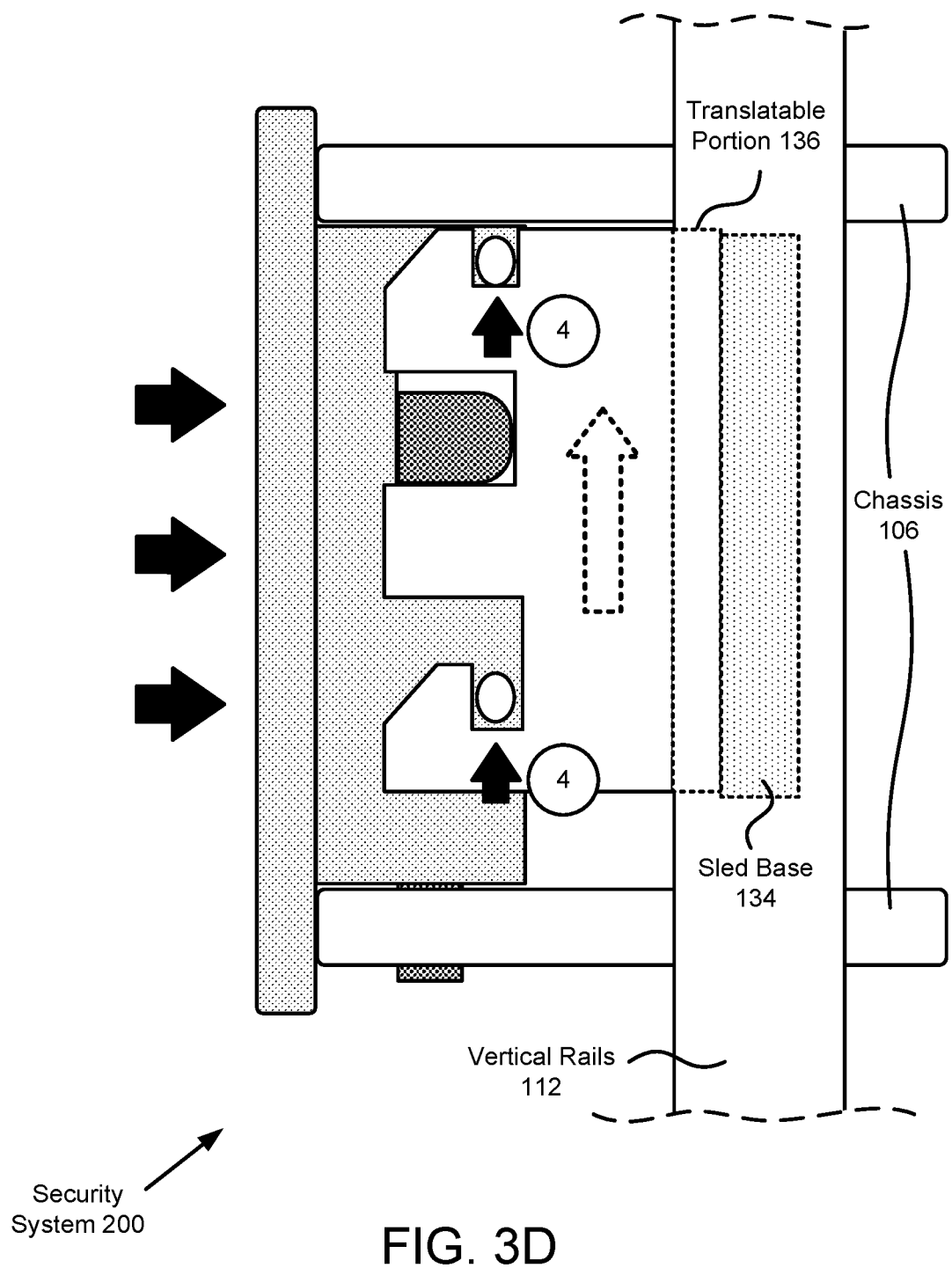

Turning to FIG. 3D, a sixth diagram illustrating security system 200 in accordance with an embodiment is shown.

At operation 4, the constant force from the return mechanism may move sled 128 in an upward direction. By doing so, the bezel pins may be locked in place by bezel pin receivers 126, thereby locking security bezel 108 to vertical rails 112.

In contrast to the operations discussed in FIGS. 3A-3D, security bezel 108 may be unlocked from vertical rails 112. For example, consider a scenario where security bezel 108 is initially locked to vertical rails 112 as shown in FIGS. 3D-3E.

Figure 3E:
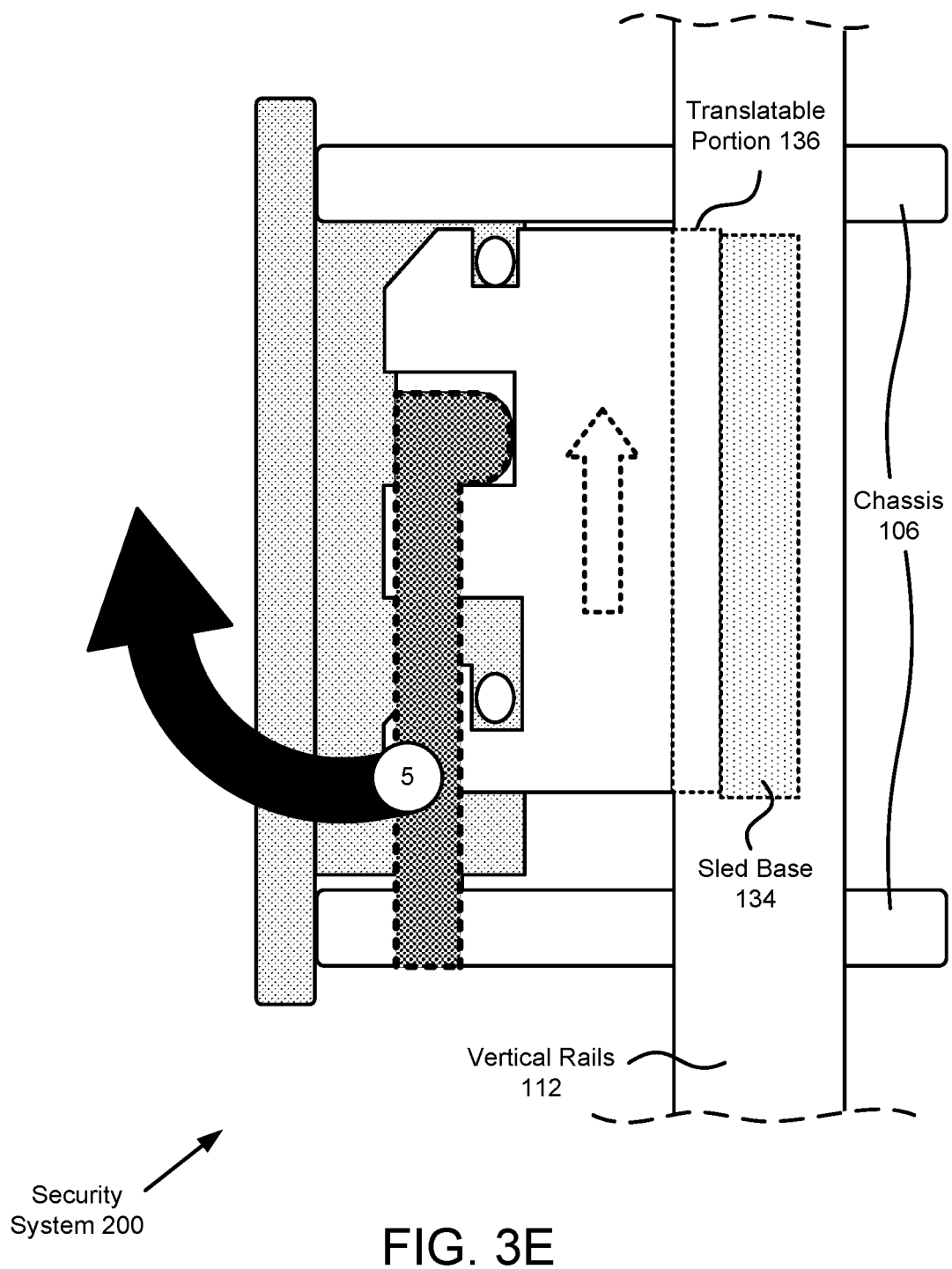

Turning to FIG. 3E, a seventh diagram illustrating security system 200 in accordance with an embodiment is shown. As shown in FIG. 3E, the constant force from the return mechanism may push sled 128 in the upward direction (e.g., toward a top of the page), thereby locking security bezel 108 in place. As noted above, security bezel 108 may be unlocked from vertical rails 112.

To initiate unlocking of security bezel 108 from vertical rails 112, at operation 5, latch 122 may be manipulated, for example, by a person attempting to unlock security bezel 108 from vertical rails 112.

It will be appreciated that although latch 122 may be covered by components included in security system 200, in FIGS. 3E-3H latch 122 may be illustrated as overlapping the other components for ease of visibility and discussion.

Figure 3F:
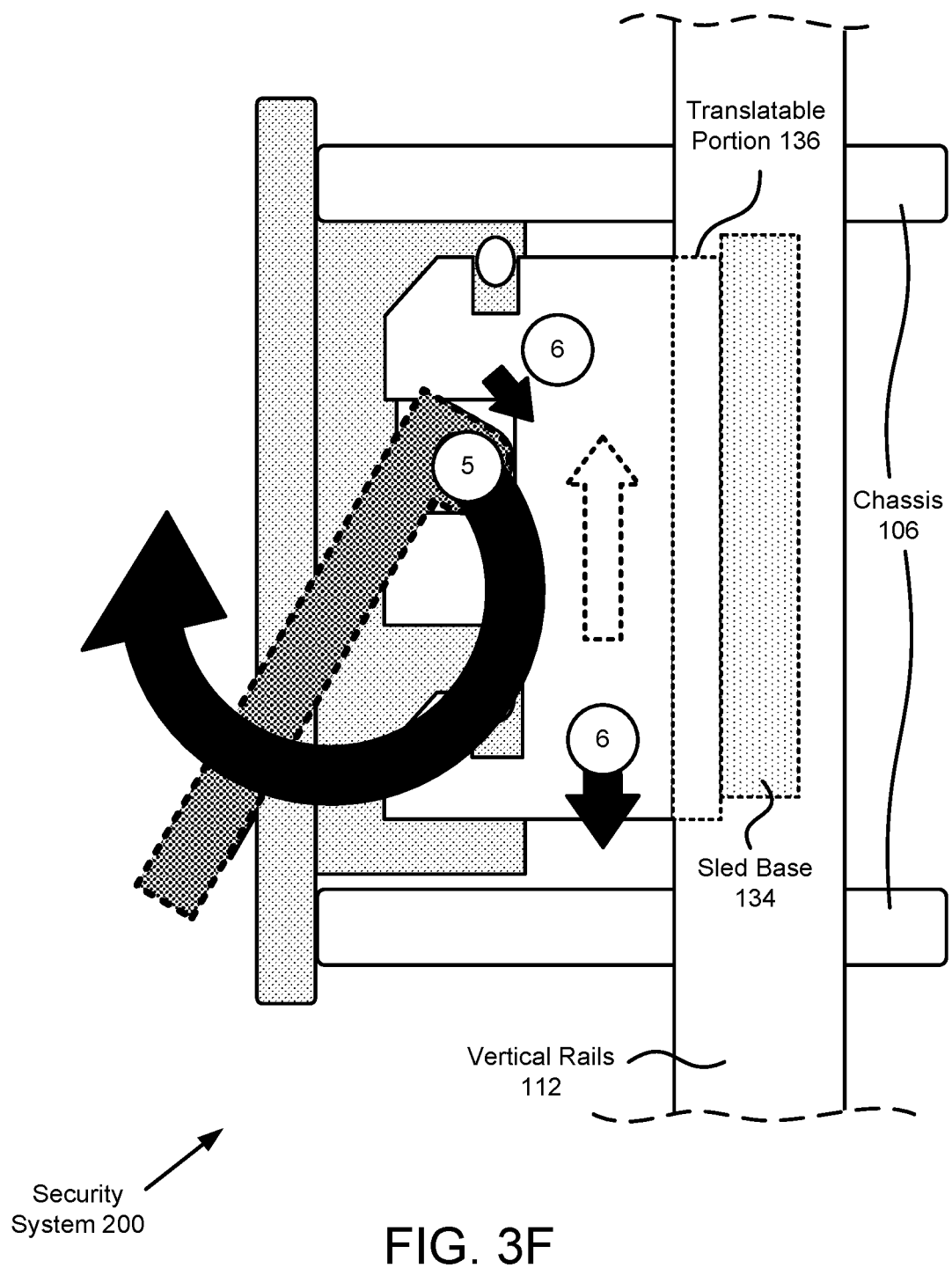

Turning to FIG. 3F, an eighth diagram illustrating security system 200 in accordance with an embodiment is shown.

At operation 6, manipulation of latch 122 may cause a shape of latch 122 to apply force to latch receiver 132. By applying force to latch receiver 132, the constant force from the return mechanism may be at least partially overcome, thereby initiating movement of sled 128 in the downward direction.

Figure 3G:
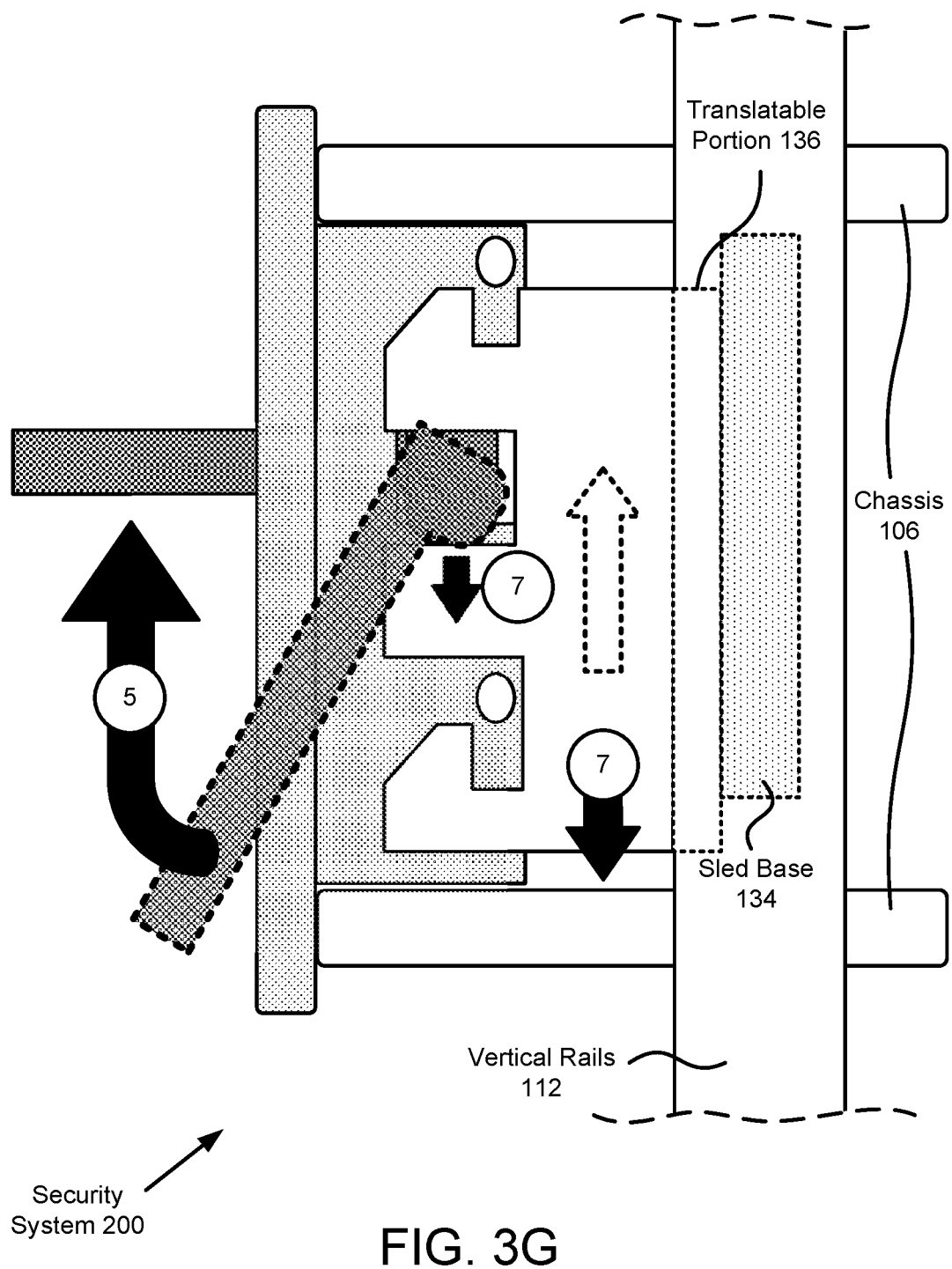

Turning to FIG. 3G, a ninth diagram illustrating security system 200 in accordance with an embodiment is shown.

At operation 7, manipulation of latch 122 may further cause the shape of latch 122 to continue applying force to latch receiver 132, thereby moving sled 128 further in the downward direction. This continued application of force on latch receiver 132 may fully overcome the constant force of the return mechanism. While the constant force is fully overcome, sled 128 may be positioned such that the bezel pins are no longer locked by bezel pin receivers 126.

Figure 3H:
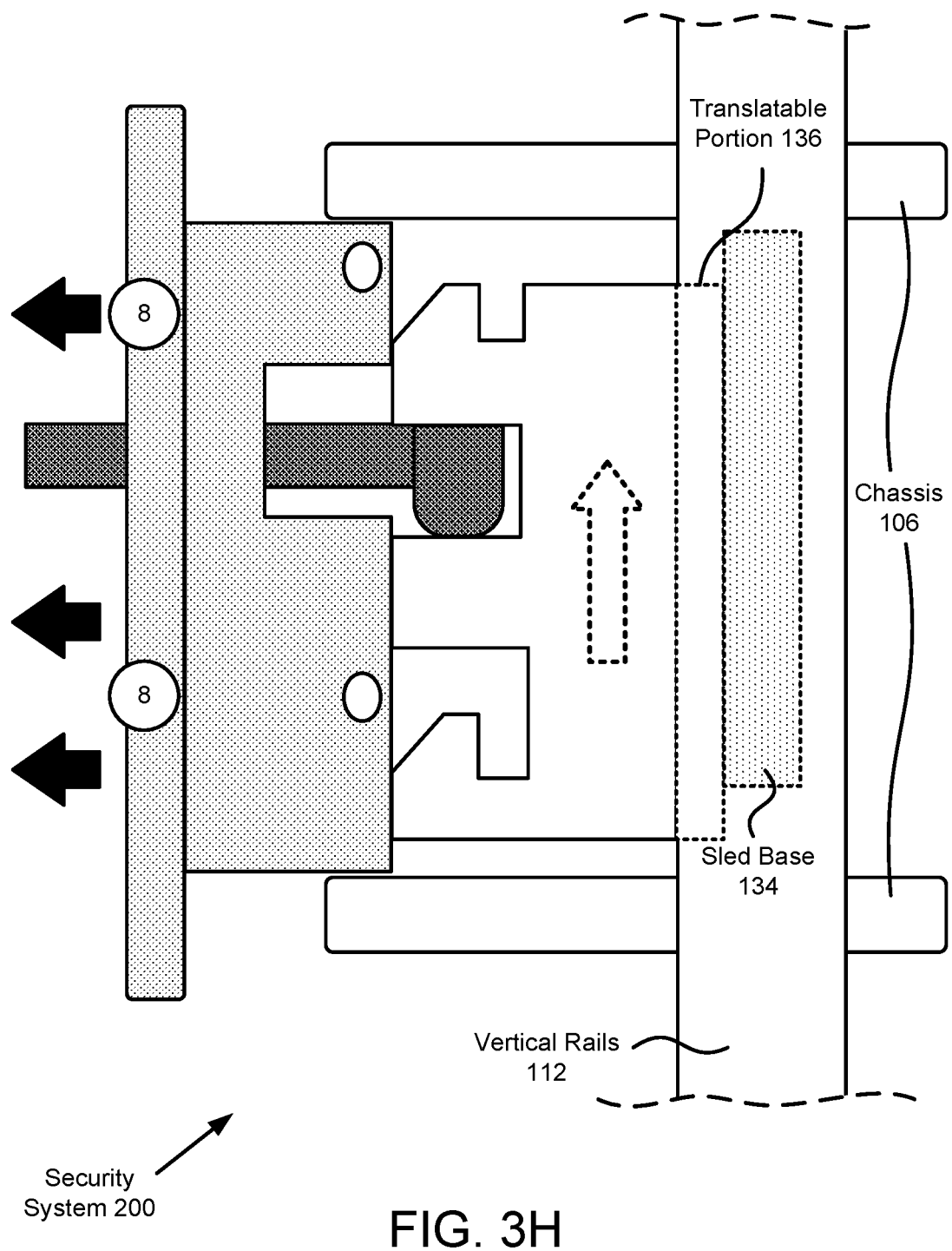

Turning to FIG. 3H, a tenth diagram illustrating security system 200 in accordance with an embodiment is shown.

At operation 8 and based on the unlocking of security bezel 108 from vertical rails 112 (discussed in FIG. 3G), security bezel 108 may be moved away from sled 128 until security bezel 108 is fully removed chassis 106.

Thus, security bezel 108 may be reversibly locked to vertical rails 112 based on manipulation of sled 128.

Figure 4:
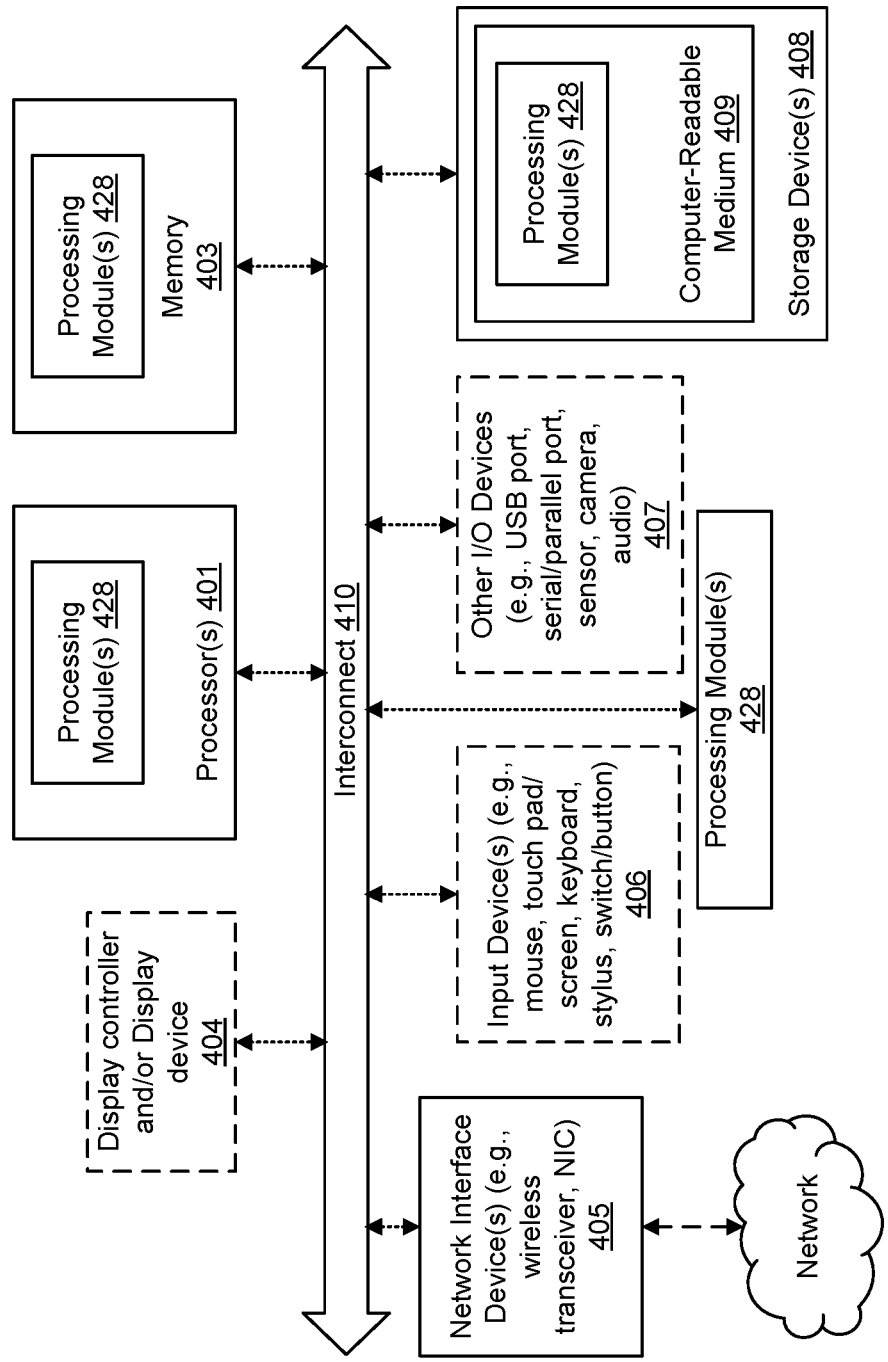
FIG. 4 shows a block diagram illustrating a data processing system in accordance with an embodiment.

Any of the components illustrated in FIGS. 1A-3H may be implemented with and/or used in conjunction with one or more computing devices. For example, the security bezel may be used to secure a chassis in which components of a data processing system may be positioned (e.g., processors, memory, etc.). Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMAX transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid-state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components as such details are not germane to embodiments disclosed herein. It will also be appreciated that network computers, handheld computers, mobile phones, servers, and/or other data processing systems which have fewer components, or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A security system for a chassis of a data processing system, the security system comprising:
   a security bezel adapted to:
      limit access to an interior of the chassis through an opening in the chassis while the security bezel is positioned with the opening, and
      limit movement of the chassis with respect to rails of a rack mount system for the chassis while the security bezel is locked to at least one of the rails; and
   a slidable sled adapted to:
      directly and reversibly attach to the at least one of the rails,
      slide along the at least one of the rails to which the slidable sled is directly and reversibly attached, and
      while attached to a rail, reversibly fixedly attach to the security bezel to position the security bezel with the opening.

2. The security system of claim 1, wherein the security bezel comprises:
   a structural body;
   a collar that extends from a surface of the structural body; and
   a bezel pin adapted to interface with the slidable sled to reversibly fixedly attached to the security bezel, wherein the bezel pin is connected to and extends from a surface of the collar.

3. The security system of claim 2, wherein the collar has a shape adapted to fit into a portion of the chassis to maintain alignment of the security bezel with the slidable sled during reversible fixed attachment of the security bezel to the slidable sled.

4. The security system of claim 2, wherein the structural body has a shape that is adapted to cover the opening when positioned with the opening, and a structure that allows gasses to flow through the opening while the structural body is positioned with the opening.

5. The security system of claim 4, the structure of the structural body also being adapted to prevent intrusion into the chassis via the opening.

6. The security system of claim 2, wherein the slidable sled comprises:
   a first portion adapted to attach to the at least one of the rails in a fixed, non-movable manner;
   a second portion that slides along the at least one of the rails to which the slidable sled is directly and reversibly attached by being slidably attached to the first portion to enable translation of the second portion between a first position and a second position while the first portion is attached to the at least one of the rails, the first portion and the second portion being formed together as a single unified component that is used as slidable sled; and
   a bezel pin receiver to receive the bezel pin, while the bezel pin is received by the bezel pin receiver the security bezel is fixedly attached to the slidable sled.

7. The security system of claim 6, wherein receiving the bezel pin by the bezel pin receiver comprises an approach of the bezel pin to the bezel pin receiver, the bezel pin applying a force to the bezel pin receiver during the approach to cause the second portion to move from the first position to the second position, and the second portion returning to the first position once the bezel pin is received by the bezel pin receiver.

8. The security system of claim 7, wherein the slidable sled further comprises a return spring adapted to return the second portion of the slidable sled to the first position.

9. The security system of claim 8, further comprising:
   a force receiving member adapted to receive a force, when the force is received via the force receiving member, the return spring being overcome and the second portion moving from the first position to the second position to facilitate detachment of the security bezel from the slidable sled.

10. The security system of claim 9, wherein the detachment of the security bezel is adapted to permit movement of the chassis.

11. The security system of claim 9, further comprising:
   a latch adapted to apply the force to the force receiving member.

12. The security system of claim 1, wherein the slidable sled comprises:
   a first portion adapted to attach to the at least one of the rails in a fixed, non-movable manner; and a second portion that is slidably attached to the first portion to enable, when the slidable sled slides along the at least one of the rails, translation of the second portion between a first position and a second position while the first portion is attached to the at least one of the rails, the first portion and the second portion being formed together as a single unified component that is used as the slidable sled.

13. An enclosure comprising:

a chassis; and a security system for the chassis, the security system comprising:

a security bezel adapted to:
limit access to an interior of the chassis through an opening in the chassis while the security bezel is positioned with the opening, and
limit movement of the chassis with respect to rails of a rack mount system for the chassis while the security bezel is locked to at least one of the rails; and a slidable sled adapted to:
directly and reversibly attach to the at least one of the rails,
slide along the at least one of the rails to which the slidable sled is directly and reversibly attached, and
while attached to a rail, reversibly fixedly attach to the security bezel to position the security bezel with the opening.

14. The enclosure of claim 13, wherein the security bezel comprises:

a structural body;

a collar that extends from a surface of the structural body; and a bezel pin adapted to interface with the slidable sled to reversibly fixedly attach to the security bezel, wherein the bezel pin is connected to and extends from a surface of the collar.

15. The enclosure of claim 14, wherein the collar has a shape adapted to fit into a portion of the chassis to maintain alignment of the security bezel with the slidable sled during reversible fixed attachment of the security bezel to the slidable sled.

16. The enclosure of claim 14, wherein the slidable sled comprises:

a first portion adapted to attach to the at least one of the rails in a fixed, non-movable manner;

a second portion that slides along the at least one of the rails to which the slidable sled is directly and reversibly attached by being slidably attached to the first portion to enable translation of the second portion between a first position and a second position while the first portion is attached to the at least one of the rails, the first portion and the second portion being formed together as a single unified component that is used as slidable sled; and a bezel pin receiver to receive the bezel pin, while the bezel pin is received by the bezel pin receiver the security bezel is fixedly attached to the slidable sled.

17. The enclosure of claim 16, wherein a detachment of the security bezel from the slidable sled is adapted to permit movement of the chassis.

18. A data processing system comprising:

a chassis;

hardware components positioned in the chassis; and a security system for the chassis, the security system comprising:

a security bezel adapted to:
limit access to an interior of the chassis through an opening in the chassis while the security bezel is positioned with the opening, and
limit movement of the chassis with respect to rails of a rack mount system for the chassis while the security bezel is locked to at least one of the rails; and a slidable sled adapted to:
directly and reversibly attach to the at least one of the rails,
slide along the at least one of the rails to which the slidable sled is directly and reversibly attached, and
while attached to a rail, reversibly fixedly attach to the security bezel to position the security bezel with the opening.

19. The data processing system of claim 18, wherein the security bezel comprises:

a structural body;

a collar that extends from a surface of the structural body; and a bezel pin adapted to interface with the slidable sled to reversibly fixedly attach to the security bezel, wherein the bezel pin is connected to and extends from a surface of the collar.

20. The data processing system of claim 19, wherein the collar has a shape adapted to fit into a portion of the chassis to maintain alignment of the security bezel with the slidable sled during reversible fixed attachment of the security bezel to the slidable sled.

* * * * *